US012638719B2

(12) United States Patent
Li et al.

(10) Patent No.: US 12,638,719 B2
(45) Date of Patent: May 26, 2026

(54) OPTICAL STRUCTURE FILM AND LIGHT SOURCE MODULE

(71) Applicant: Coretronic Corporation, Hsin-Chu (TW)

(72) Inventors: Ching-Hsiang Li, Hsin-Chu (TW); Shu-Ping Yang, Hsin-Chu (TW); Chung-Wei Huang, Hsin-Chu (TW); Chih-Jen Tsang, Hsin-Chu (TW); Ching-Wei Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 19/231,560

(22) Filed: Jun. 9, 2025

(65) Prior Publication Data

US 2025/0389985 A1 Dec. 25, 2025

(30) Foreign Application Priority Data

Jun. 19, 2024 (CN) ......................... 202410792865.X

(51) Int. Cl.
*G02F 1/13357* (2006.01)
*G02B 5/02* (2006.01)

(52) U.S. Cl.
CPC ....... *G02F 1/133606* (2013.01); *G02B 5/021* (2013.01); *G02B 5/0278* (2013.01); *G02F 1/133611* (2013.01)

(58) Field of Classification Search
CPC ......... G02F 1/133606; G02F 1/133611; G02F 1/133607; G02F 1/133602; G02F 1/1336; G02F 1/133603; G02B 5/021; G02B 5/0278
See application file for complete search history.

(56) References Cited

U.S. PATENT DOCUMENTS

| | | | | |
|---|---|---|---|---|
| 2003/0133301 A1* | 7/2003 | Mullen | ................ | G02B 6/0046 |
| | | | | 362/333 |
| 2015/0085220 A1* | 3/2015 | Chen | ................ | G02F 1/133606 |
| | | | | 349/62 |
| 2023/0204846 A1* | 6/2023 | Wang | ................... | G02B 6/0053 |
| | | | | 362/97.1 |

FOREIGN PATENT DOCUMENTS

| | | |
|---|---|---|
| CN | 101057168 | 10/2007 |
| CN | 116360150 | 6/2023 |
| EP | 0357629 B1 | 10/1994 |

(Continued)

OTHER PUBLICATIONS

"Office Action of Taiwan counterpart Application", issued on Dec. 2, 2025, p. 1-p. 9.

*Primary Examiner* — Bao Q Truong
(74) *Attorney, Agent, or Firm* — JCIPRNET

(57) ABSTRACT

A light source module including an illuminant board and an optical structure film is provided. The optical structure film is arranged on the illuminant board and includes multiple first microstructures on a first surface and multiple second microstructures on a second surface. Each of the first microstructures includes two first inclined planes opposite to each other and two second inclined planes opposite to each other. An included angle between the first inclined plane and the first surface is greater than an included angle between the second inclined plane and the first surface. Each of the second microstructures has a top surface with a concave shape, and the top surface includes four curve surfaces and four third inclined surfaces.

20 Claims, 8 Drawing Sheets

101

102

(56) References Cited

FOREIGN PATENT DOCUMENTS

| TW | 200933222 A | 8/2009 |
| TW | M651163 | 2/2024 |

* cited by examiner

210R

210U

210R

210U

210C

210U

Z
Y
X

210

OPTICAL STRUCTURE FILM AND LIGHT SOURCE MODULE

CROSS-REFERENCE TO RELATED APPLICATION

This application claims the priority benefit of China application serial no. 202410792865.X, filed on Jun. 19, 2024. The entirety of the above-mentioned patent application is hereby incorporated by reference herein and made a part of this specification.

BACKGROUND

Technical Field

The disclosure relates to an optical structure film and a light source module.

Description of Related Art

The development of direct-lit type LED backlight modules in the current industry is focused on the goal of reducing the number of LEDs and thicknesses. However, in the process of achieving this development goal, the issue of uneven screen display becomes increasingly severe. Thus, to improve screen uniformity, it is often necessary to stack a diffusion board and multiple optical films on the LED illuminant board.

For example, the current direct-lit type LED backlight modules on the market are configured with at least an LED illuminant board, a diffusion board, two structure diffusion films, a lower diffusion sheet, a prism sheet, and a dual brightness enhancement film (DBEF) sequentially from bottom to top. However, despite the improved screen uniformity under this structure with multiple optical films (boards), problems including increased costs and thicknesses as well as reduced yield also occur.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

In order to achieve one, some, or all of the above objectives or other objectives, an embodiment of the disclosure provides an optical structure film, including a substrate, multiple first microstructures, and multiple second microstructures. The substrate has a first surface and a second surface opposite to each other. The first microstructures are arranged in an array form on the first surface. The first microstructure includes two first inclined planes opposite to each other and two second inclined planes connected to the two first inclined planes. The two second inclined planes are opposite to each other and connected to each other. A first included angle between the first inclined plane and the first surface is greater than a second included angle between the second inclined plane and the first surface. The first included angle and the second included angle are greater than 0 degrees. The second microstructures are arranged in the array form on the second surface. The second microstructure has a top surface with a concave shape. The top surface has four endpoints when viewed towards the second surface, and a line connecting the four endpoints forms a rectangle. The top surface includes four curved surfaces and four third inclined surfaces respectively connected to the four curved surfaces. The four endpoints are respectively located on the four third inclined surfaces, and the four third inclined surfaces respectively extend from the four endpoints towards a top surface center of the top surface and are connected to each other.

According to another embodiment of the disclosure, a light source module including an illuminant board and an optical structure film is provided. The illuminant board includes multiple light-emitting elements arranged in an array form. The optical structure film is arranged on the illuminant board, and the optical structure film includes a substrate, multiple first microstructures and multiple second microstructures. The substrate has a first surface and a second surface opposite to each other. The first microstructures are arranged in an array form on the first surface. The first microstructure includes two first inclined planes opposite to each other and two second inclined planes connected to the two first inclined planes. The two second inclined planes are opposite to each other and connected to each other. A first included angle between the first inclined plane and the first surface is greater than a second included angle between the second inclined plane and the first surface. The first included angle and the second included angle are greater than 0 degrees. The second microstructures are arranged in the array form on the second surface. The second microstructure has a top surface with a concave shape. The top surface has four endpoints when viewed towards the second surface, and a line connecting the four endpoints forms a rectangle. The top surface includes four curved surfaces and four third inclined surfaces respectively connected to the four curved surfaces. The four endpoints are respectively located on the four third inclined surfaces, and the four third inclined surfaces respectively extend from the four endpoints towards a top surface center of the top surface and are connected to each other.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
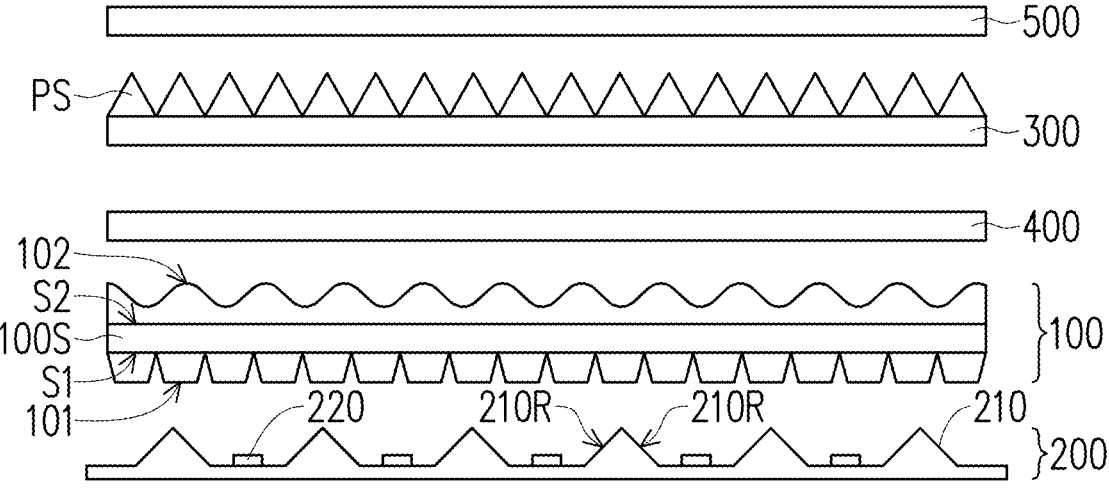
FIG. 1 shows a schematic diagram of a light source module according to an embodiment of the disclosure.
Figure 1:

Please refer to FIG. 1, which shows a schematic diagram of a light source module according to an embodiment of the disclosure. A light source module 1 includes an illuminant board 200, an optical structure film 100, a diffusion sheet 400, a prism sheet 300, and a brightness enhancement film 500 arranged in a stacking manner. These films and sheets are configured on an X-Y plane and are sequentially stacked along a Z-direction. An X-direction, a Y-direction, and the Z-direction are perpendicular to each other.

Figure 2:
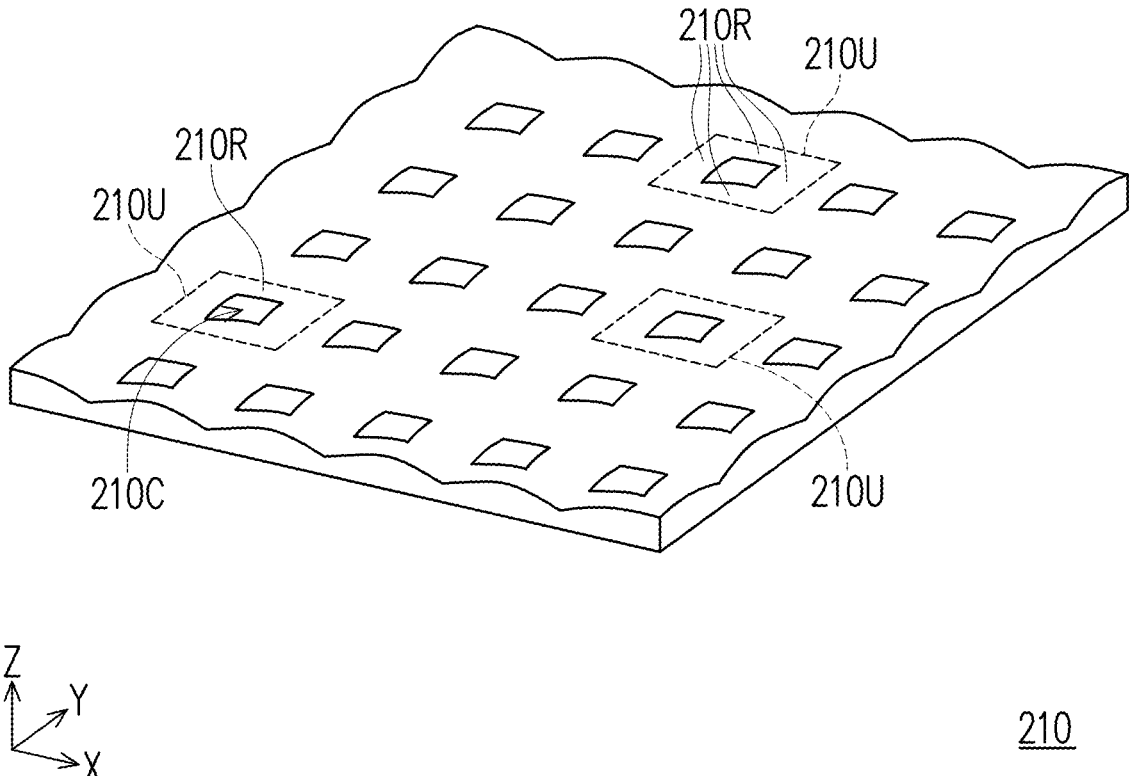
FIG. 2 shows a schematic diagram of a grid structure according to an embodiment of the disclosure.

Please refer to FIGS. 1 and 2 at the same time. The illuminant board 200 includes a grid structure 210 and multiple light-emitting elements 220 arranged in an array form. The grid structure 210 has multiple accommodating grooves 210C and multiple reflective surfaces 210R respectively surrounding the accommodating grooves 210C. The light-emitting elements 220 are respectively located in the accommodating grooves 210C and surrounded by the reflective surfaces 210R. Specifically, the grid structure 210 includes multiple grid units 210U arranged in an array form. Each grid unit 210U includes an accommodating groove 210C and the reflective surfaces 210R surrounding the accommodating groove 210C. The light-emitting elements 220 are respectively arranged in the accommodating grooves 210C of the grid units 210U. The light emitted from the light-emitting element 220 is reflected by the reflective surface 210R and thus homogenized, which prevents the light source module 1 from producing noticeable bright spots.

Figure 3A:
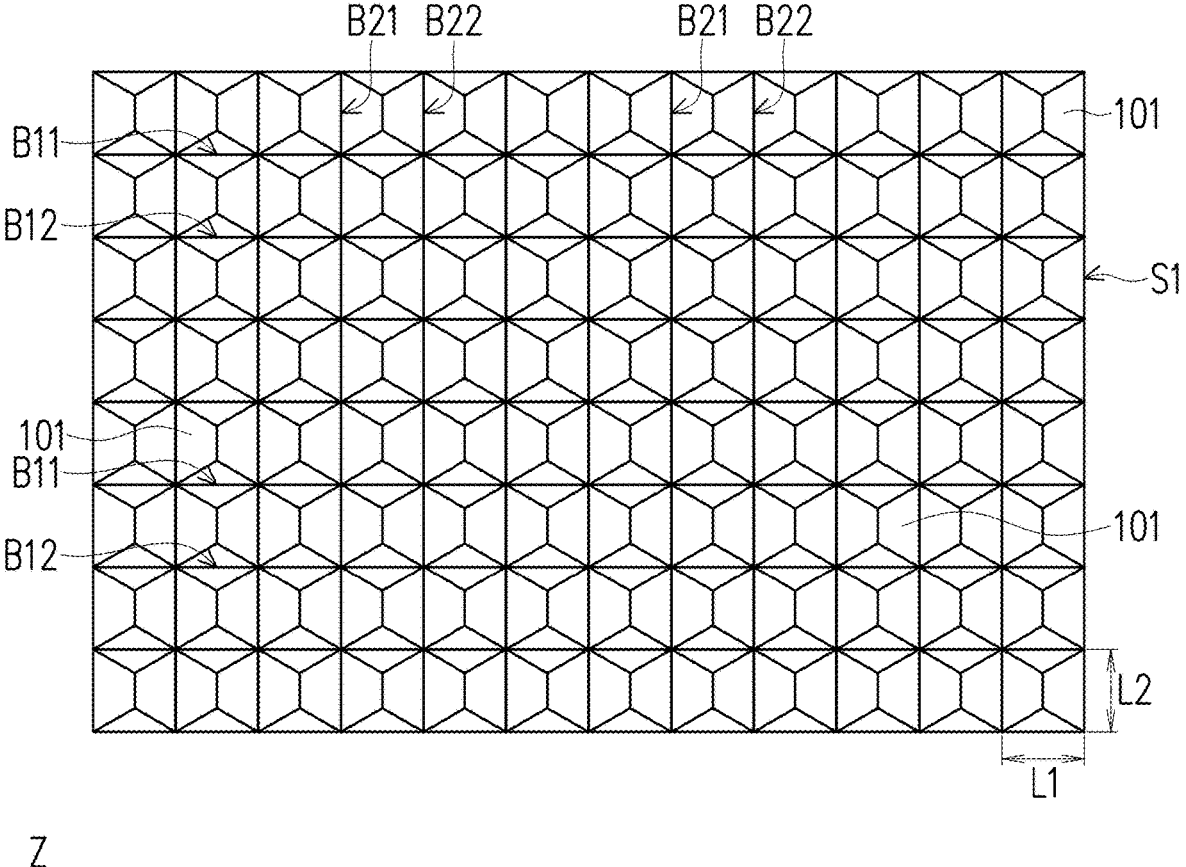
FIG. 3A shows a schematic diagram of multiple first microstructures according to an embodiment of the disclosure.
Figure 4A:
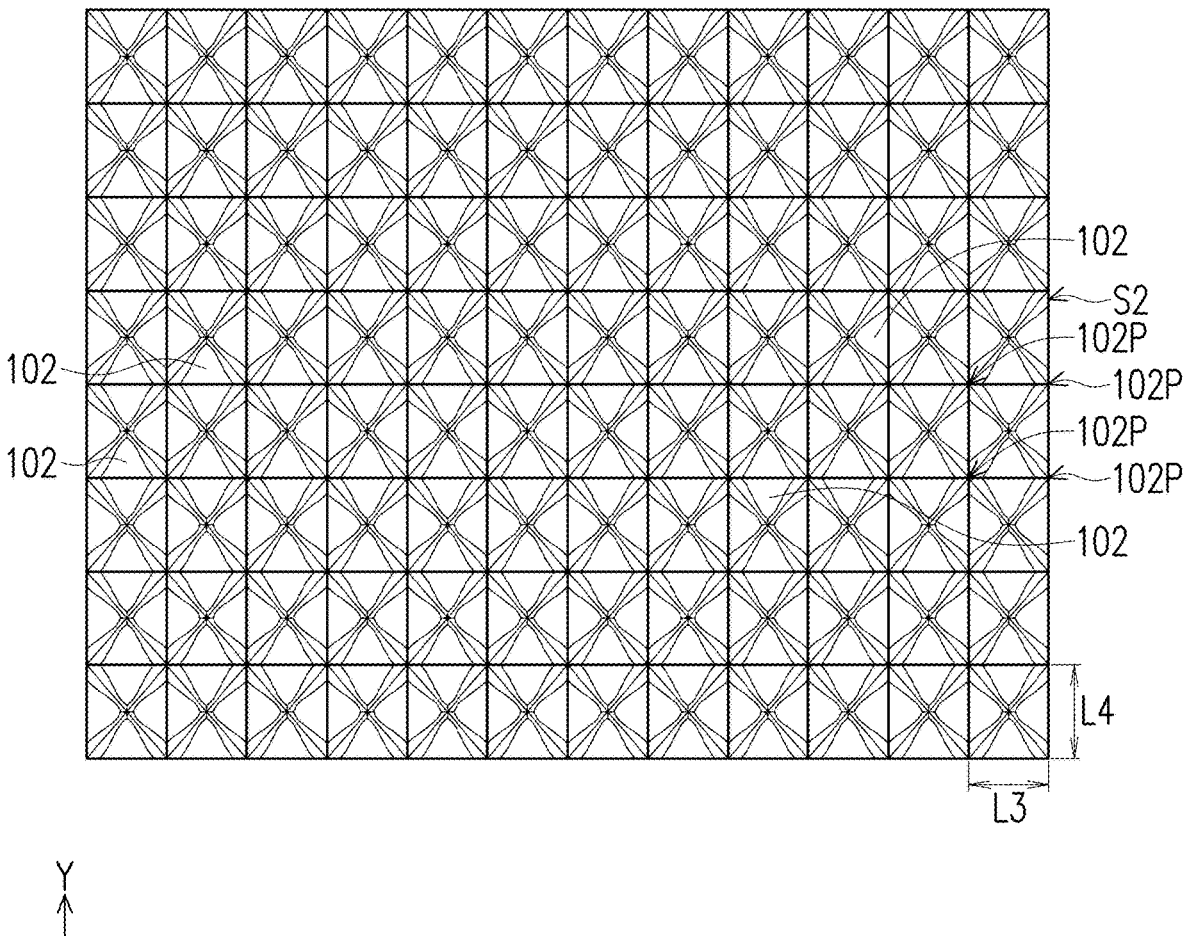
FIG. 4A shows a schematic diagram of multiple second microstructures according to an embodiment of the disclosure.

The optical structure film 100 in FIG. 1 is arranged on the illuminant board 200 and in the transmission path of the light beams emitted from the light-emitting element 220. The optical structure film 100 includes a substrate 100S. The substrate 100S has a first surface S1 and a second surface S2 opposite to each other. Multiple first microstructures 101 are arranged in an array form on the first surface S1, as shown in FIG. 3A. Multiple second microstructures 102 are arranged in an array form on the second surface S2, as shown in FIG. 4A.

Figure 3B:
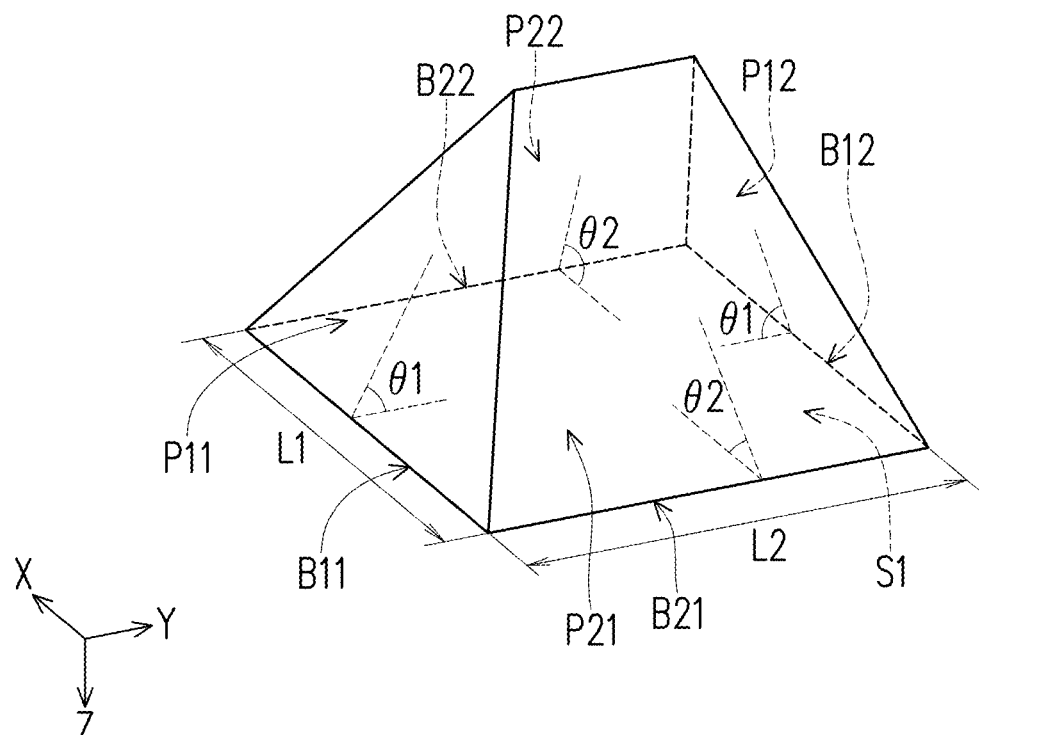
FIG. 3B shows a diagram of a perspective view of a first microstructure in FIG. 3A.
Figure 3C:
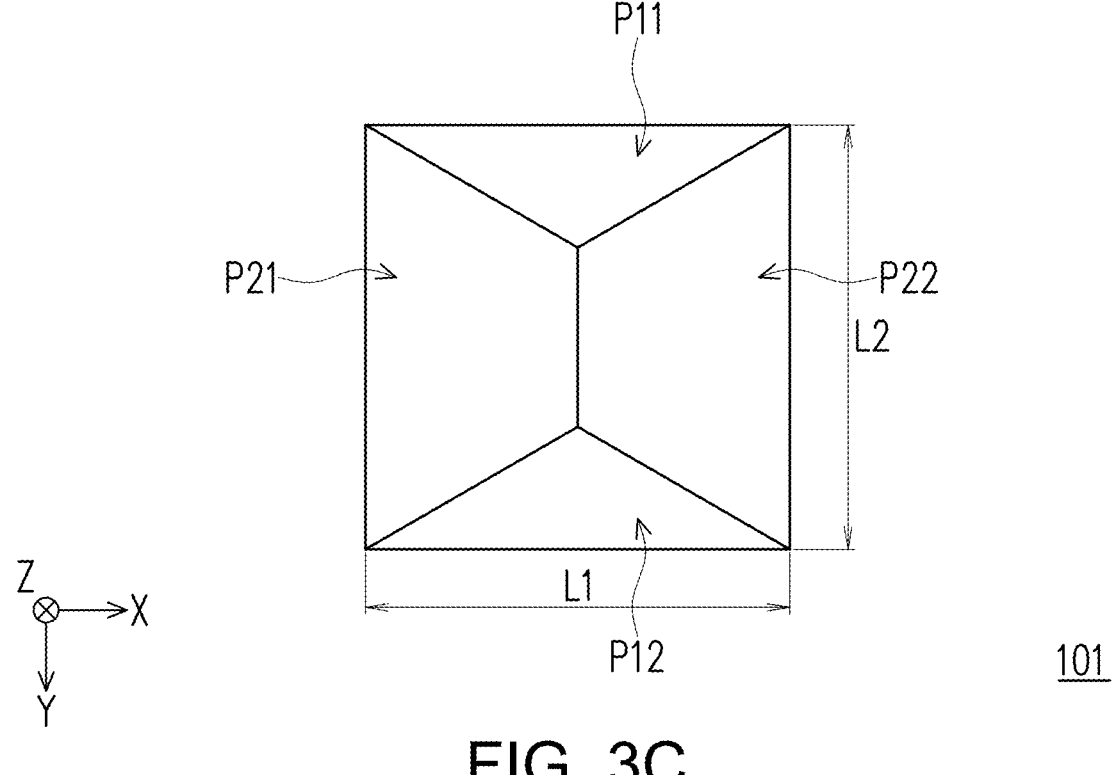
FIG. 3C shows a diagram of a plan view of a first microstructure in FIG. 3A.

Please refer to FIGS. 1 and 3A to 3C. FIG. 3A shows the first microstructures 101 on the first surface S1. FIG. 3B shows a diagram of a perspective view of the first microstructures 101. FIG. 3C shows a diagram of a plan view of the first microstructures 101.

Each first microstructure 101 protrudes opposite the first surface S1 and towards a negative Z-direction, i.e., towards the illuminant board 200. Each first microstructure 101 includes a first inclined plane P11 and a first inclined plane P12 opposite to each other. Each first microstructure 101 also includes a second inclined plane P21 and a second inclined plane P22 connected to the first inclined planes P11 and P12. The second inclined plane P21 and the second inclined plane P22 are opposite to each other and connected to each other. The disposition of the four inclined planes P11, P12, P21, and P22 effectively enhances the light splitting effect of the optical structure film 100.

The first inclined plane P11 forms a first included angle θ1 with the first surface S1. The first inclined plane P12 also forms the first included angle θ1 with the first surface S1. The second inclined plane P21 forms a second included angle θ2 with the first surface S1. The second inclined plane P22 also forms the second included angle θ2 with the first surface S1. Specifically, in this embodiment, the first inclined planes P11 and P12 are disposed symmetrically, and the second inclined planes P21 and P22 are also disposed symmetrically. However, the disclosure is not limited thereto. The first included angle θ1 and the second included angle θ2 are both greater than 0 degrees, and the first included angle θ1 is greater than the second included angle θ2. In some embodiments, the first included angle θ1 ranges from 55 degrees to 80 degrees, and the second included angle θ2 ranges from 30 degrees to 55 degrees.

In this embodiment, the first inclined plane P11 has a first edge B11 located on the first surface S1, and the first inclined plane P12 has a first edge B12 located on the first surface S1. The first edge B11 and the first edge B12 are parallel to a first direction (e.g., the X-direction) and have a length L1. The second inclined plane P21 has a second edge B21 located on the first surface S1, and the second inclined plane P22 has a second edge B22 located on the first surface S1. The second edge B21 and the second edge B22 are parallel to a second direction (e.g., the Y-direction) and have a length L2, with the first direction being perpendicular to the second direction. However, the disclosure is not limited thereto. In some embodiments, the first edge B11 and the first edge B12 may not be parallel to each other, and the second edge B21 and the second edge B22 may not be parallel to each other.

In this embodiment, the first edge B11 and the first edge B12 are both parallel to the X-direction, and the second edge B21 and the second edge B22 are both parallel to the Y-direction. The X-direction is generally parallel to an edge of the light source module 1 (e.g., a long edge of the light source module 1), and the Y-direction is generally parallel to another edge of the light source module 1 (e.g., a short edge of the light source module 1). However, the disclosure is not limited thereto. In some embodiments, the X-direction and the Y-direction may not be parallel to any edge of the light source module 1.

In this embodiment, as shown in FIG. 3A, the second edge B21 of one of two first microstructures 101 adjacent in the X-direction overlaps the second edge B22 of the other first microstructure 101. The first edge B11 of one of two first microstructures 101 adjacent in the Y-direction overlaps the second edge B12 of the other first microstructure 101. Since multiple first microstructures 101 are continuously and adjacently arranged on the optical structure film 100, i.e., there is no gap between two adjacent first microstructures 101, the light-emitting elements 220 of the illuminant board 200 are not required to be aligned with the first microstructures 101. That is, the fabrication precision of the light-emitting elements 220 and the tolerance requirement for assembling the module may be lowered. In addition, costs can be lowered by reducing the number of the light-emitting elements 220 without causing noticeable bright spots. On the other hand, since the homogeneous distribution of the light penetrating the optical structure film 100 is further improved, the optical distance required for the light source module 1 is effectively shortened, thereby reducing the thickness of the light source module 1.

However, the disclosure is not limited thereto. In some embodiments, there may be gaps between two adjacent first microstructures 101, i.e., the second edge B21 of one of two first microstructures 101 adjacent in the X-direction may not overlap the second edge B22 of the other first microstructure 101, and/or the first edge B11 of one of two first microstructures 101 adjacent in the Y-direction may not overlap the first edge B12 of the other first microstructure 101.

Figures 4B, 4C:
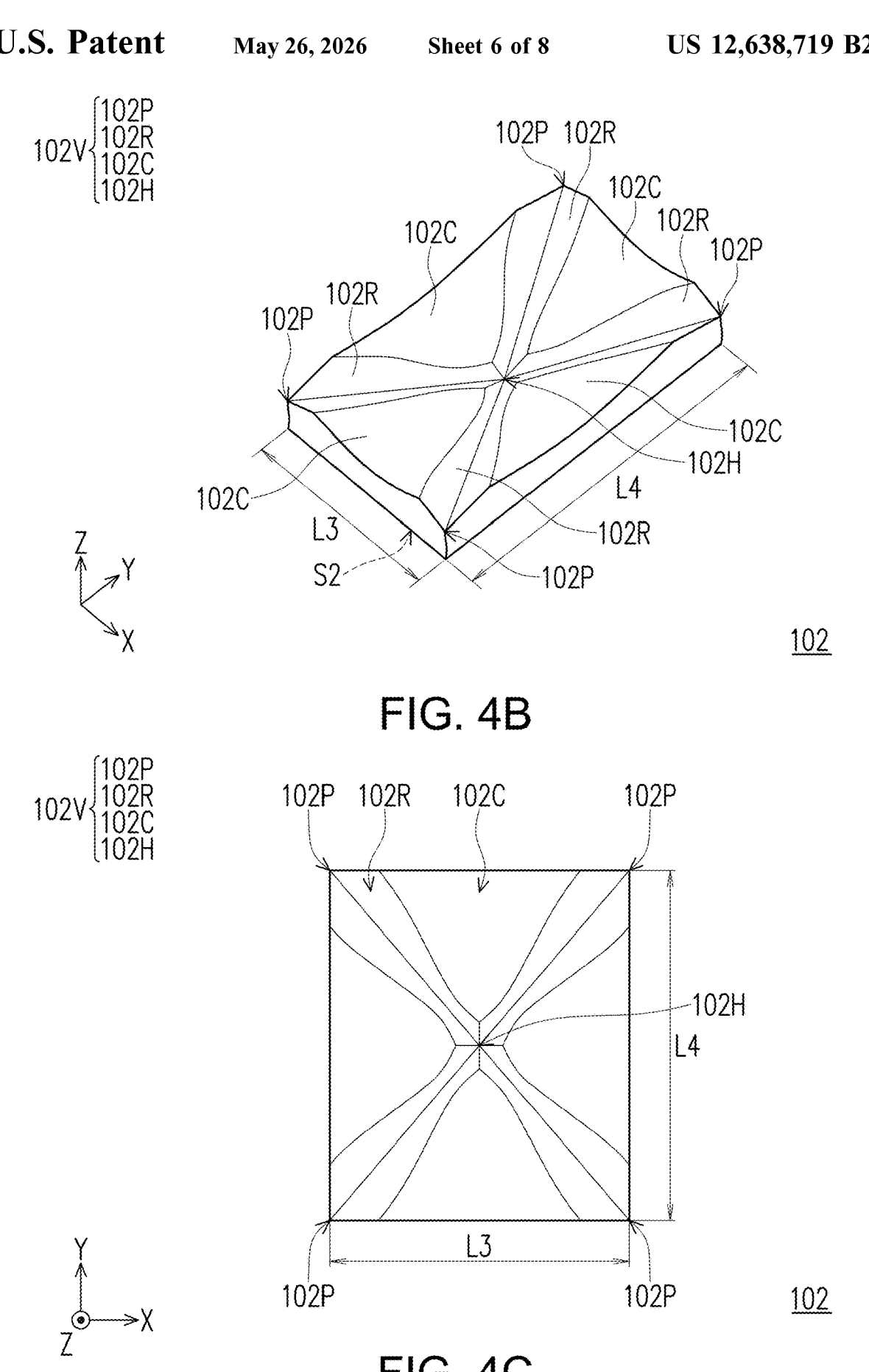
FIG. 4B shows a diagram of a perspective view of a second microstructure in FIG. 4A.
FIG. 4C shows a diagram of a plan view of a second microstructure in FIG. 4A.
Figures 4D, 4E:
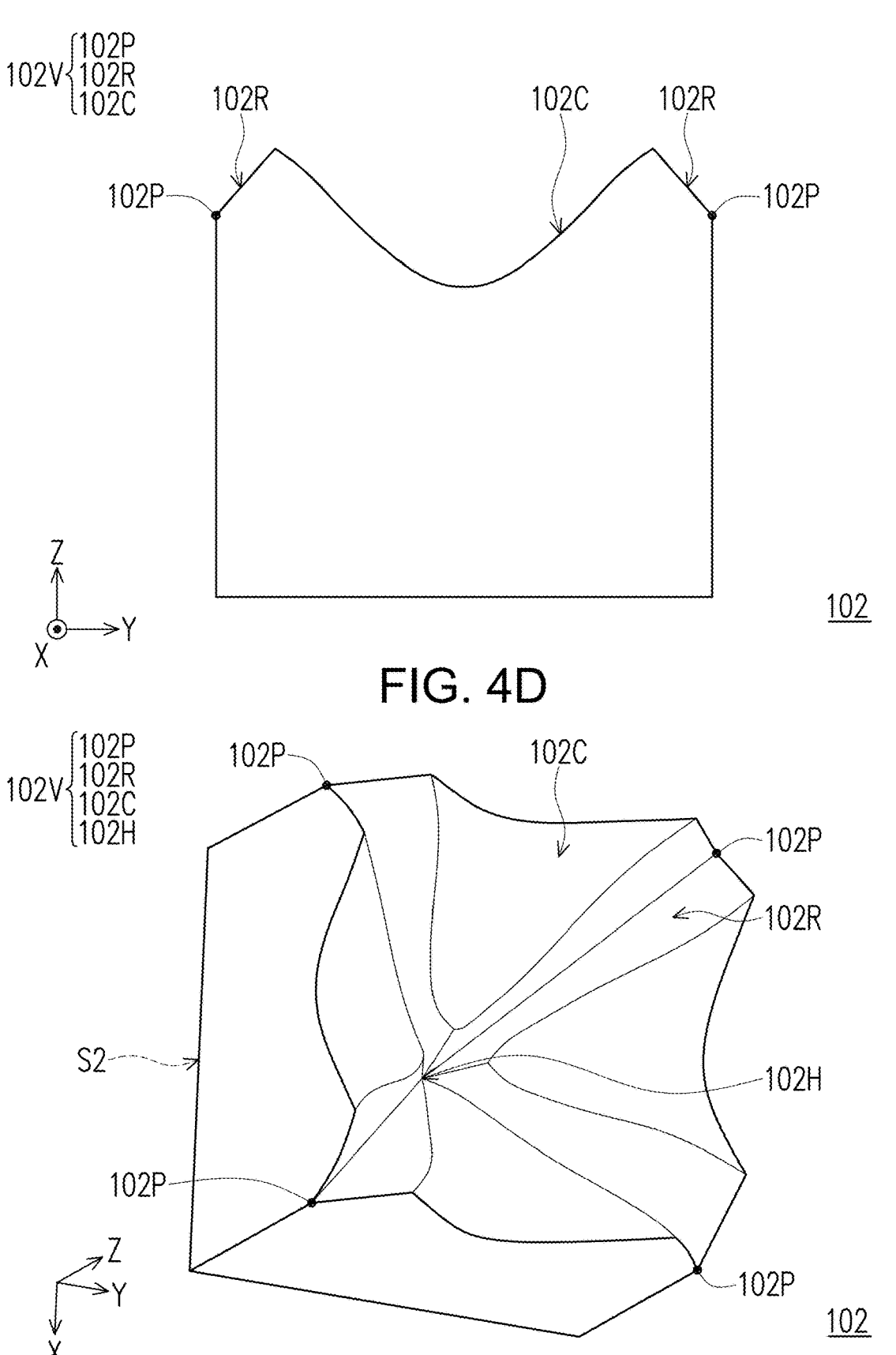
FIG. 4D shows a diagram of a lateral view of a second microstructure in FIG. 4A.
FIG. 4E shows a schematic diagram of a perspective view of a second microstructure according to another embodiment of the disclosure.

Please refer to FIGS. 1 and 4A to 4C. FIG. 4A shows the second microstructures 102 on the second surface S2. FIG. 4B shows a diagram of a perspective view of the second microstructure 102. FIG. 4C shows a diagram of a plan view of the second microstructure 102. FIG. 4D shows a diagram of a lateral view of the second microstructure 102.

Each second microstructure 102 protrudes opposite the second surface S2 and towards a positive Z-direction, i.e., away from the illuminant board 200. The second microstructure 102 has a top surface 102V that is concave towards the second surface S2 of the substrate 100S. Specifically, when viewed towards the second surface S2, the top surface 102V has four endpoints 102P and a top surface center 102H. The four endpoints 102P and the top surface center 102H are located in the positive Z-direction and away from the second surface S2. A line connecting the four endpoints 102P forms a rectangle, and the top surface center 102H is closer to the second surface S2 than the four endpoints 102P.

The top surface 102V includes four curved surfaces 102C and four third inclined surfaces 102R connected to the four curved surfaces 102C. The four endpoints 102P are respectively located on the four third inclined surfaces 102R. The four third inclined surfaces 102R respectively extend from the four endpoints 102P towards the top surface center 102H of the top surface 102V and are connected to each other.

Specifically, each third inclined surface 102R is a V-shaped structure surface that forms a groove. A line connecting the endpoint 102P on the third inclined surface 102R and the top surface center 102H forms a ridge line (a base edge) of the V-shaped structure surface. In addition, on the top surface 102V, a projection of a diagonal line of the rectangle formed by the line connecting the four endpoints 102P overlaps the base edges of the four V-shaped structure surfaces. Moreover, an included angle between two inclined planes of each V-shaped structure surface ranges from 45 degrees to 135 degrees. Preferably, the included angle is at 50 degrees. Accordingly, through the disposition of the four V-shaped structure surfaces, the light homogenizing effect of each top surface 102V can be enhanced.

In this embodiment, as shown in FIG. 4A, two endpoints 102P of one of two adjacent second microstructures 102 overlap two endpoints 102P of the other second microstructure 102, i.e., the four endpoints 102P of each second microstructure 102 overlap the endpoints 102P of the surrounding second microstructures 102. That is, the second microstructures 102 on the second surface S2 are continuously and adjacently disposed, with no gaps between adjacent second microstructures 102. Since the second microstructures 102 are continuously arranged on the optical structure film 100, the light-emitting elements 220 of the illuminant board 200 are not required to be aligned with the second microstructures 102. That is, the fabrication precision of the light-emitting elements 220 and the tolerance requirement for assembling the module may be lowered. In addition, costs can be lowered by reducing the number of the light-emitting elements 220 without causing noticeable bright spots. On the other hand, since the homogeneous distribution of the light penetrating the optical structure film 100 is further improved, the optical distance required for the light source module 1 is effectively shortened, thereby reducing the thickness of the light source module 1.

However, the disclosure is not limited thereto. In some embodiments, there may be gaps between two adjacent second microstructures 102, i.e., two endpoints 102P of one of two adjacent second microstructures 102 may not overlap two endpoints 102P of the other second microstructure 102.

Please refer to FIG. 4B. The rectangle formed by the line connecting the four endpoints 102P has a vertical projection on the second surface S2, with four perpendicular sides. Two of the sides (third sides) are parallel to the X-direction and have a length L3, and the other two sides (fourth sides) are parallel to the Y-direction and have a length L4. In some embodiments, the length L1 of the first edge B11 and the first edge B12 of the first microstructure 101 is K times the length L3 of the third side of the rectangle formed by the projection of the second microstructure 102 on the second surface S2. The length L2 of the second edge B21 and the second edge B22 of the first microstructure 101 is K times the length LA of the fourth side of the rectangle formed by the projection of the second microstructure 102 on the second surface S2. K is a positive integer greater than or equal to 1 and less than or equal to 10. In some embodiments, the length L3 of the third side of the rectangle formed by the projection of the second microstructure 102 on the second surface S2 is M times the length L1 of the first edge B11 and the first edge B12 of the first microstructure 101. The length L4 of the fourth side of the rectangle formed by the projection of the second microstructure 102 on the second surface S2 is M times the length L2 of the second edge B21 and the second edge B22 of the first microstructure 101. M is a positive integer greater than or equal to 1 and less than or equal to 10.

Please refer to FIG. 4E. According to an embodiment of the disclosure, the rectangle formed by the projection of the second microstructure 102 on the second surface S2 is square, i.e., the length L3 is equal to the length LA. However, the disclosure is not limited thereto.

Please refer to FIGS. 1, 3A, and 3B again. The optical structure film 100 of the light source module 1 is located between the illuminant board 200 and the prism sheet 300. The prism sheet 300 includes multiple prism structures PS extending along the X-direction and arranged along the Y-direction. That is, the prism sheet 300 provides significant light collection effects in the Y-direction. On the other hand, as mentioned above, the included angle θ1 between the first inclined plane P11 and the first surface S1 as well as between the first inclined plane P12 and the first surface S1 is greater than the included angle θ2 between the second inclined plane P21 and the first surface S1 as well as between the second inclined plane P22 and the first surface S1. In other words, each first microstructure 101 provides light-splitting effects in both the X-direction and the Y-direction, wherein the light-splitting effect in the Y-direction is greater than the light-splitting effect in the X-direction.

In summary, the light source module 1 in the embodiments of the disclosure has at least one of the following advantages: the inclined planes P11, P12, P21, and P22 of each first microstructure 101 effectively enhance the light-splitting effect of the optical structure film 100; the top surface 102V of the second microstructure 102 provides significant light homogenizing effects; the prism sheet 300 provides significant light collection effects; the fabrication precision of the light-emitting elements 220 and the tolerance requirement for assembling the module can be lowered; the number of light-emitting elements 220 can be reduced without causing noticeable bright spots; and the optical distance required for the light source module 1 can be shortened, thereby reducing the thickness of the light source module 1.

Figure 5:
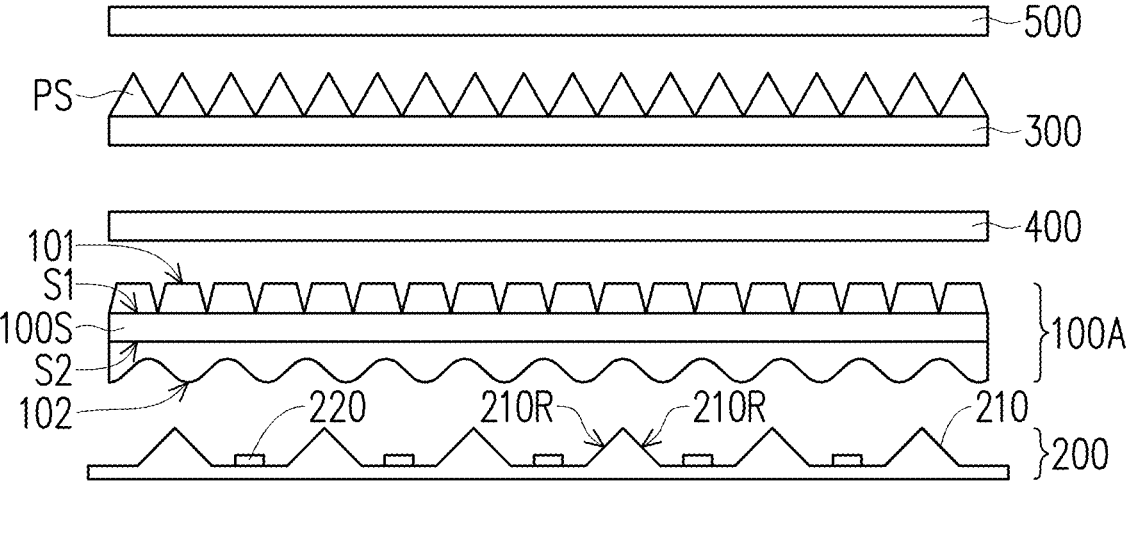
FIG. 5 shows a schematic diagram of a light source module according to still another embodiment of the disclosure.
Figure 5:
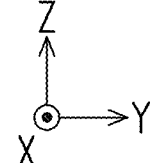

Please refer to FIG. 5, which shows a schematic diagram of a light source module according to an embodiment of the disclosure. A light source module 2 includes the illuminant board 200, an optical structure film 100A, the diffusion sheet 400, the prism sheet 300, and the brightness enhancement film 500 configured in a stacking manner. These films and sheets are configured on the X-Y plane and are sequentially stacked along the Z-direction. The X-direction, the Y-direction, and the Z-direction are perpendicular to each other.

The illuminant board 200, the diffusion sheet 400, the prism sheet 300, and the brightness enhancement film 500 in this embodiment have the same structure as the illuminant board 200, the diffusion sheet 400, the prism sheet 300, and the brightness enhancement film 500 shown in FIG. 1, and will not be further described here.

The light source module 2 in this embodiment differs from the light source module 1 shown in FIG. 1 in that each first microstructure 101 on the optical structure film 100A protrudes opposite the first surface S1 and towards the positive Z-direction, i.e., away from the illuminant board 200, and each second microstructure 102 protrudes opposite the second surface S2 and towards the negative Z-direction, i.e., towards the illuminant board 200. The first microstructure 101 and the second microstructure 102 can be implemented as any of the first microstructures 101 and the second microstructures 102 in the previous embodiments, and will not be further described here.

The light source module 2 in this embodiment has at least one of the following advantages: the inclined planes P11, P12, P21, and P22 of each first microstructure 101 effectively enhance the light-splitting effect of the optical structure film 100; the top surface 102V of the second microstructure 102 provides significant light homogenizing effects; the prism sheet 300 provides significant light collection effects; the fabrication precision of the light-emitting elements 220 and the tolerance requirement for assembling the module can be lowered; the number of light-emitting elements 220 can be reduced without causing noticeable bright spots; and the optical distance required for the light source module 2 can be shortened, thereby reducing the thickness of the light source module 2.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical structure film, comprising:
    a substrate, having a first surface and a second surface opposite to each other;
    a plurality of first microstructures, arranged in an array form on the first surface, wherein each of the plurality of first microstructures comprises two first inclined planes opposite to each other and two second inclined planes connected to the two first inclined planes, the two second inclined planes being opposite to each other and connected to each other, wherein a first included angle between each of the two first inclined planes and the first surface is greater than a second included angle between each of the two second inclined planes and the first surface, the first included angle and the second included angle being greater than 0 degrees; and a plurality of second microstructures, arranged in the array form on the second surface, wherein each of the plurality of second microstructures has a top surface with a concave shape, the top surface has four endpoints when viewed towards the second surface, a line connecting the four endpoints forms a rectangle, wherein the top surface comprises four curved surfaces and four third inclined surfaces respectively connected to the four curved surfaces, and the four endpoints are respectively located on the four third inclined surfaces, the four third inclined surfaces respectively extending from the four endpoints towards a top surface center of the top surface and being connected to each other.

2. The optical structure film according to claim 1, wherein each of the two first inclined planes has a first edge located on the first surface, and each of the two second inclined planes has a second edge located on the first surface, the first edge being parallel to a first direction, the second edge being parallel to a second direction, and the first direction is perpendicular to the second direction.

3. The optical structure film according to claim 2, wherein on the second surface, a vertical projection of the rectangle formed by the line connecting the four endpoints has a third edge and a fourth edge perpendicular to each other, the third edge is parallel to the first direction, and the fourth edge is parallel to the second direction.

4. The optical structure film according to claim 2, wherein the first edges of two adjacent ones of the plurality of first microstructures overlap each other.

5. The optical structure film according to claim 2, wherein the second edges of two adjacent ones of the plurality of first microstructures overlap each other.

6. The optical structure film according to claim 1, wherein the four endpoints of each of the plurality of second microstructures overlap the endpoints of the adjacent second microstructures.

7. The optical structure film according to claim 3, wherein a length of the first edge is K times a length of the third edge, and a length of the second edge is K times a length of the fourth edge, K being a positive integer greater than or equal to 1 and less than or equal to 10.

8. The optical structure film according to claim 3, wherein a length of the third edge is M times a length of the first edge, and a length of the fourth edge is M times a length of the second edge, M being a positive integer greater than or equal to 1 and less than or equal to 10.

9. The optical structure film according to claim 1, wherein the first included angle ranges from 55 degrees to 80 degrees, and the second included angle ranges from 30 degrees to 55 degrees.

10. A light source module, comprising:

an illuminant board, comprising a plurality of light-emitting elements arranged in an array form; and an optical structure film, arranged on the illuminant board, the optical structure film comprising:

a substrate, having a first surface and a second surface opposite to each other;

a plurality of first microstructures, arranged in an array form on the first surface, wherein each of the plurality of first microstructures comprises two first inclined planes opposite to each other and two second inclined planes connected to the two first inclined planes, the two second inclined planes being opposite to each other and connected to each other, wherein a first included angle between each of the two first inclined planes and the first surface is greater than a second included angle between each of the two second inclined planes and the first surface, the first included angle and the second included angle being greater than 0 degrees; and a plurality of second microstructures, arranged in the array form on the second surface, wherein each of the plurality of second microstructures has a top surface with a concave shape, the top surface has four endpoints when viewed towards the second surface, a line connecting the four endpoints forms a rectangle, wherein the top surface comprises four curved surfaces and four third inclined surfaces respectively connected to the four curved surfaces, and the four endpoints are respectively located on the four third inclined surfaces, the four third inclined surfaces respectively extending from the four endpoints towards a top surface center of the top surface and being connected to each other.

11. The light source module according to claim 10, wherein each of the two first inclined planes has a first edge located on the first surface, and each of the two second inclined planes has a second edge located on the first surface, the first edge being parallel to a first direction, the second edge being parallel to a second direction, and the first direction is perpendicular to the second direction.

12. The light source module according to claim 11, wherein on the second surface, a vertical projection of the rectangle formed by the line connecting the four endpoints has a third edge and a fourth edge perpendicular to each other, the third edge is parallel to the first direction, and the fourth edge is parallel to the second direction.

13. The light source module according to claim 12, further comprising a prism sheet, wherein the optical structure film is located between the illuminant board and the prism sheet, and the prism sheet comprises a plurality of prism structures extending along the first direction and arranged along the second direction.

14. The light source module according to claim 10, wherein the illuminant board further comprises a grid structure, the grid structure has a plurality of accommodating grooves and a plurality of reflective surfaces respectively surrounding the plurality of accommodating grooves, and the plurality of light-emitting elements are respectively located in the plurality of accommodating grooves and surrounded by the plurality of reflective surfaces.

15. The light source module according to claim 13, further comprising a diffusion sheet and a brightness enhancement film, wherein the illuminant board, the optical structure film, the diffusion sheet, the prism sheet, and the brightness enhancement film are sequentially stacked.

16. The optical structure film according to claim 11, wherein the first edges of two adjacent ones of the plurality of first microstructures overlap each other.

17. The optical structure film according to claim 11, wherein the second edges of two adjacent ones of the plurality of first microstructures overlap each other.

18. The optical structure film according to claim 12, wherein a length of the first edge is K times a length of the third edge, and a length of the second edge is K times a length of the fourth edge, K being a positive integer greater than or equal to 1 and less than or equal to 10.

19. The optical structure film according to claim 12, wherein a length of the third edge is M times a length of the first edge, and a length of the fourth edge is M times a length of the second edge, M being a positive integer greater than or equal to 1 and less than or equal to 10.

20. The optical structure film according to claim 10, wherein the first included angle ranges from 55 degrees to 80 degrees, and the second included angle ranges from 30 degrees to 55 degrees.

* * * * *